(12) United States Patent
Hartick

(10) Patent No.: US 6,422,007 B1
(45) Date of Patent: Jul. 23, 2002

(54) EXHAUST SYSTEM

(75) Inventor: Johannes Hartick, St. Annes (GB)

(73) Assignee: Arvinmeritor, Inc., Troy, MI (US)

( * ) Notice: Subject to any disclaimer, the term of this patent is extended or adjusted under 35 U.S.C. 154(b) by 0 days.

(21) Appl. No.: 09/700,484

(22) PCT Filed: May 17, 1999

(86) PCT No.: PCT/GB99/01560

§ 371 (c)(1), (2), (4) Date: Feb. 21, 2001

(87) PCT Pub. No.: WO99/60255

PCT Pub. Date: Nov. 25, 1999

(30) Foreign Application Priority Data

May 15, 1998 (GB) .............................................. 9810601

(51) Int. Cl.[7] .................................................. F01N 3/00
(52) U.S. Cl. ............................. 60/298; 60/320; 60/301; 60/287
(58) Field of Search .......................... 60/320, 298, 274, 60/299, 301, 287

(56) References Cited

U.S. PATENT DOCUMENTS

| | | | | |
|---|---|---|---|---|
| 1,159,061 A | * | 7/1915 | Walker et al. | |
| 3,599,427 A | * | 8/1971 | Jones et al. | 60/30 |
| 4,023,360 A | * | 5/1977 | Wossner et al. | 60/286 |
| 4,685,291 A | * | 8/1987 | Ha | 60/286 |
| 5,477,676 A | * | 12/1995 | Benson et al. | 60/300 |
| 5,499,501 A | * | 3/1996 | Kato et al. | 60/286 |
| 5,603,215 A | * | 2/1997 | Sung et al. | 60/297 |
| 5,687,565 A | * | 11/1997 | Modica et al. | 60/297 |
| 5,753,188 A | * | 5/1998 | Shimoda et al. | 60/286 |
| 5,934,073 A | * | 8/1999 | Giesshoff et al. | 60/286 |
| 5,937,637 A | * | 8/1999 | Fujishita et al. | 60/288 |
| 5,987,885 A | * | 11/1999 | Kizer et al. | 60/298 |
| 6,089,014 A | * | 7/2000 | Day et al. | 60/297 |

FOREIGN PATENT DOCUMENTS

| | | |
|---|---|---|
| GB | 1 338 733 | 1/1973 |
| GB | 2 319 736 A | 6/1998 |
| JP | 5-044445 A | 2/1993 |
| JP | 10-054228 A | 2/1998 |

* cited by examiner

*Primary Examiner*—Thomas Denion
*Assistant Examiner*—Diem T Tran
(74) *Attorney, Agent, or Firm*—Barnes & Thornburg

(57) ABSTRACT

An exhaust system or an engine (12) includes a lean NOx catalytic device (18), and a heat exchanger (70) positioned upstream of the catalytic device (18). Control means (44, 46) controls a valve (36) to regulate exhaust gas flow through the heat exchanger (70) or along a bypass path (26). The heat exchanger (70) can cool the exhaust gases to ensure that the maximum operating temperature of the catalytic device (1) is not exceeded. During use, the heat exchanger (70) can be bypassed to allow high temperature purge cycles.

13 Claims, 10 Drawing Sheets

EXHAUST SYSTEM

CROSS-REFERENCES TO RELATED APPLICATIONS

This application is a U.S. national application of international application serial No. PCT/GB99/01560 filed May 17, 1999, which claims priority to Great Britain Patent Application No. 9810601.6 filed May 15, 1998.

The present invention relates to an exhaust system for an internal combustion engine, in particular to an exhaust system employing a catalytic device for purifying the exhaust gases. The invention is especially suitable for a system for a lean burn engine (employing a lean NOx catalytic device), but it is not limited exclusively to this.

In general terms, the need to operate a catalytic device above a minimum operating temperature is well known in the art. For example, EP-A-0460507, GB-A2278068 and WO 96/27734 describe arrangements for routing the exhaust along an appropriate exhaust path if the gas is not at an optimum high temperature, or if the catalytic devices have not yet reached there optimum temperatures.

The increasing cost of fuel and the concern over $CO_2$ emissions has lead a drive for engines with improved fuel economy. Lean burn engines have been developed using gasoline direct injection and port injection techniques.

Under these lean operating conditions the standard 3-way catalyst is very efficient for CO and hydrocarbon (HC) oxidation, but the reduction of oxides of nitrogen NOx (NO and $NO_2$) to di-nitrogen ($N_2$) is considerably more difficult. Catalytic converters and traps are being developed which can operate under lean conditions. The "lean" problem is that, there is generally an insufficient quantity of hydrocarbons in the exhaust gas to enable efficient conversion of all of the NOx to di-nitrogen at the catalytic device. One type lean burn engine uses a lean cycle and an intermittent stoichiometric or rich cycle. A catalytic trap can be used which absorbs the excess NOx gases during the lean cycle, and then converts the NOx to $N_2$ in the presence of more hydrocarbons during the rich cycle. The rich cycle is sometimes referred to as the "purge" cycle.

Although lean NOx catalytic converters and traps offer potentially enormous emissions benefits, it has been extremely difficult to attain the full potential of the catalytic devices, especially under conditions in which the engine is working hard (for example, for high speed vehicle cruising). The reason is that, under such conditions, the temperature of the exhaust gas entering the catalytic trap often exceeds the optimum operating range for the catalytic device. For example, FIG. 17 illustrates the typical temperatures characteristics for a lean NOx trap. The catalytic material has a coating for absorbing the excess NOx, but this is only effective up to about 450° C. On the other hand, the reduction of the oxides in the presence of hydrocarbons is only effective at temperatures above about 200° C. This creates a useful temperature window from approximately 200–450° C. in which the lean NOx conversion can occur. At temperatures outside this window (for example, caused by high engine speed), the catalytic trap will not operate efficiently. Lean NOx catalytic converters also operate in a similar temperature range.

Broadly speaking, one aspect of the present invention is to provide a cooling heat exchanger unit upstream of a catalytic device, and a control device for providing selective cooling of the exhaust gas upstream of the catalytic device, using the heat exchanger.

With the invention, the heat exchanger unit can provide sufficient cooling to cool the hot exhaust gases to a desired catalytic operating temperature, or to within a desired operating temperature window, for efficient catalytic operation.

Moreover, cooling of the exhaust gases provides other performance advantages, specifically by reducing the volume of the gas, and thus the volume flow rate through the exhaust system. This can help reduce the backpressure within the exhaust system, and can also help reduce flow noise through the system, especially at high engine speeds and loads. These are significant problems associated with lean NOx catalytic devices, which tend to require relatively large substrates for efficient lean NOx operation. The use of large substrates can cause undesirable backpressure build up. The reduction in back pressure will help to improve fuel economy and reduce $CO_2$ emissions.

The heat exchanger unit may be a gas cooled unit (for example, air cooled), or it may be liquid cooled. The latter is preferred for the following reasons:

(a) A liquid-cooled heat exchanger can avoid the occurrence of transient temperature drops which air-cooled exchangers can cause. Initially, an air-cooled heat exchanger will be much colder than the hot exhaust gases and, when the hot gases first pass through the exchanger, the large temperature difference causes a very efficient heatsink effect to occur. Such large transients can cause the temperature to fall below an optimum operating range of the catalytic device until the heat exchanger heats up to near the exhaust gas temperature;

(b) A liquid-cooled heat exchanger remains at the temperature of the coolant, and never heats up to the exhaust gas temperature. Heat transfer is achieved through the large heat capacity of the liquid, and does not depend (at least to much extent) on the precise temperature of the coolant itself. In contrast, an air-cooled exchanger necessarily heats up to near the exhaust gas temperature, and dissipates heat by being much hotter than the surroundings. This can cause design problems for placement on a vehicle away from hazardous (temperature sensitive) areas, and also requires the presence of a cooling air flow, in use.

(c) A liquid-cooled heat exchanger can enable the use of an open-loop control system for controlling the cooling operation without having to measure directly the temperature of the exhaust gas in the exhaust system. Most vehicles are not equipped with an exhaust temperature sensor, and the addition of such a sensor able to withstand harsh exhaust conditions represents additional expense. With a liquid-cooled system, the exhaust gas temperature can be predicted using the outputs from conventional vehicle sensors for sensing, for example, the engine inlet air temperature, the engine coolant temperature, the engine speed, the air mass flow entering the engine, and the fuel:air mixture (measured using a lambda sensor).

(d) A liquid heat exchanger can generally be made more compact than a air-cooled heat exchanger.

If a liquid heat exchanger is used, then preferably, this is coupled to an existing coolant circuit of a vehicle, such as, for example, the engine coolant circuit.

If a gas-cooled heat exchanger is used, then the arrangement should comprise a gas inlet tube, a heat exchanger unit coupled to the inlet tube, and an outlet tube exiting the heat exchanger unit, the heat exchanger unit having a greater heat dissipation effect than the inlet and outlet tubes.

In either type of system, the exhaust system preferably comprises a first flow path through the heat exchanger for cooling the gas in the first path, and a second flow path bypassing the heat exchanger. The second path may flow through the housing of the heat exchanger along a substantially non-heat exchange (or at least a low-heat exchange) path.

In another broad aspect, the invention provides a method, and also a control apparatus, for controlling operation of a cooling device for cooling exhaust gas upstream of a catalytic exhaust purification device.

In one preferred aspect, the method includes predicting the exhaust gas temperature from a plurality of characteristics which are each not directly indicative of the exhaust temperature, and controlling cooling operation in response to the predicted exhaust gas temperature.

In another preferred aspect, the method includes controlling the cooling during a first engine cycle to achieve an exhaust temperature within a first operating range for the catalytic device, and during a second engine cycle to achieve an exhaust temperature within a second operating range for the catalytic device.

The second operating range (achieved after the first operating range) may include a higher maximum temperature than the first operating range. For example, the second operating range may correspond to a stoichiometric cycle, or to a sulphur purge cycle. The first cycle may correspond to a lean cycle.

Embodiments of the invention are now described by way of example only, with reference to accompanying drawings, in which.

Figure 1:
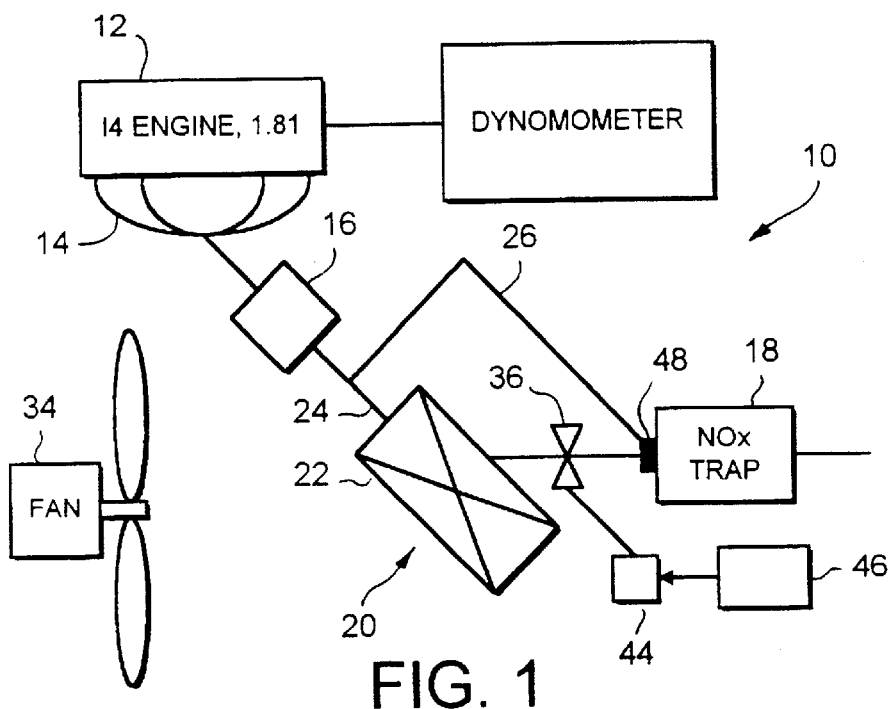
FIG. 1 is a schematic view illustrating a first embodiment of an exhaust system for a lean burn engine.

Referring to FIG. 1, a test exhaust system 10 is illustrated for a lean burn engine, identified schematically at 12. The exhaust system comprises an exhaust manifold 14 coupled to the exhaust ports of the engine 12, a conventional light-off catalytic converter 16 arranged close to the engine 12 to provide catalytic purification when the engine is first run, and a lean NOx catalytic device 18 arranged downstream of the light-off converter 16. The lean NOx device 18 may either be a catalytic trap, or a lean catalytic converter, to suit the engine 12.

Arranged between the light-off converter 16 and the lean NOx device 18 is a cooling arrangement 20 which consists of a heat exchanger unit 22 arranged in a first gas flow path 24, and a second gas flow path 26 bypassing the heat exchanger unit 22.

Figure 2:
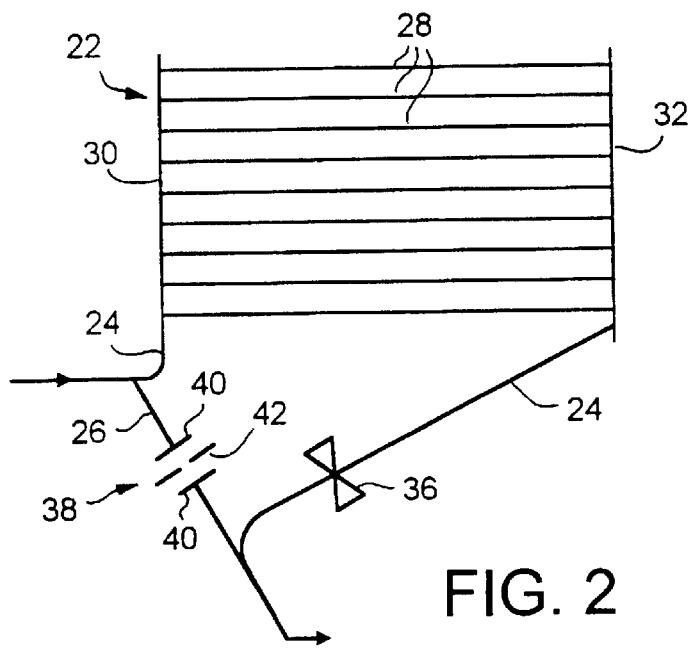
FIG. 2 is a schematic view illustrating the heat exchanger in more detail.

Referring to FIG. 2, in this embodiment the heat exchanger unit 22 is air cooled, and comprises a linear radiator arrangement of nine steel exchanger tubes 28 extending between an inlet manifold tube 30 and an outlet manifold tube 32. The exchanger tubes 28 are cooled by moving air, represented by the fan 34 (FIG. 1).

In the illustrated test arrangement, the exchanger tubes 28 are approximately 600 mm long, with an inside diameter of about 22 mm. The fan 34 provides an ambient air speed of about 2.5 m/s over the heat exchanger unit 22.

Flow through the first and second paths 24 and 26 is controlled by a valve 36 situated in the first flow path 24 downstream of the heat exchanger unit 22. The flow resistance of the second path 26 relative to the first path 24 is such that, when the valve 36 is open, a substantial portion of the gas flows through the first path 24 through the heat exchanger 22. When the valve 36 is closed, the gas has to flow through the second path 26, and thereby bypasses the heat exchanger 22. The flow rates through the first and second paths are selected such that neither path presents too high an impedance, which would otherwise cause undesirable back pressure in the exhaust path.

In the test arrangement illustrated in FIG. 2, the impedance of the second path 26 is made adjustable by means of a replaceable constriction assembly 38. The assembly 38 consists of two flanges 40 between which is received an exchangeable disc 42 having an orifice of a predetermined size.

The valve 36 is a vacuum controlled butterfly valve, which is controlled by means of an electrical solenoid 44. The solenoid is controlled by a control unit 46, described further below.

The above valve control arrangement is preferred, as it avoids the need to place a valve in the direct flow of very hot exhaust gases. Instead, the valve 36 is placed downstream of the heat exchanger unit, and so is exposed to less hot exhaust gas. This can increase valve life, and enable a less expensive valve to be used. However, it will be appreciated that in other embodiments, a flow switching valve may be used in the second flow path 26 if desired, or at one of the junctions between the first and second flow paths 24 and 26 if desired. The valve may be a butterfly type or other type of valve, as appropriate.

In this embodiment, a temperature sensor 48 measures the exhaust gas temperature upstream of the lean NOx catalytic device 18. For example, the temperature sensor 48 may be located at the inlet to the device 18, or upstream of the heat exchanger unit 22. The control unit 46 may, for example, be a straightforward threshold sensing unit (with hysteresis if desired) which controls the valve 36 to open when the exhaust gas exceeds a threshold temperature, so that the temperature is maintained in a desired temperature window. Alternatively, the control unit 46 may include a predictive control algorithm representing a thermal model of the exhaust system to predict the exhaust gas temperature depending on the load conditions of the engine.

Figure 3:
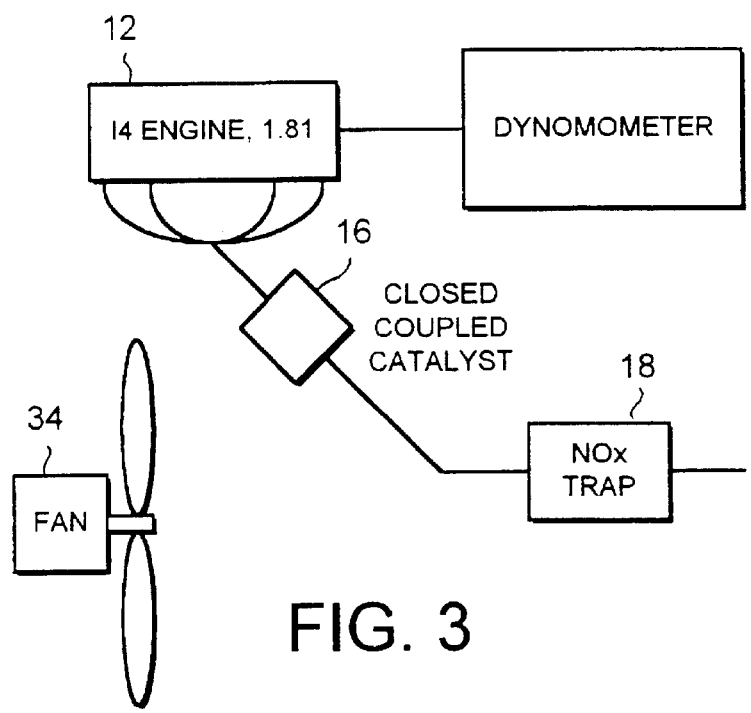
FIG. 3 is a schematic view illustrating a comparative prior art exhaust system.

To test the effect of the heat exchanger, the same exhaust system was also used in a conventional test arrangement, as illustrated in FIG. 3. Referring to FIG. 3, features described above are denoted by the same reference numerals, where appropriate. In this conventional test arrangement, the heat exchanger of FIG. 1 is replaced by a steel tube approximately 750 mm long. This is equivalent to the path length the exhaust gas travels when the valve 36 of FIG. 1 is closed. This pipe length is also representative of the typical distance between a close coupled (light-off) catalytic converter in a vehicle engine bay, and an NOx trap in an underfloor position on a vehicle.

Figure 4:
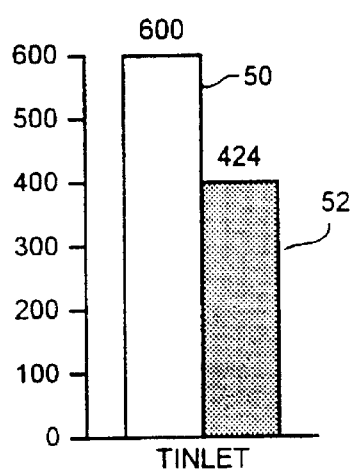
FIG. 4 is a graph illustrating gas temperatures during steady state cruising.
Figure 5:
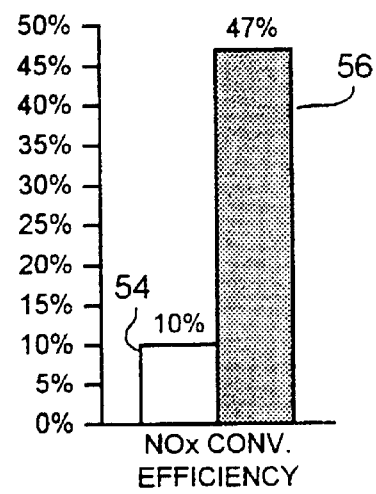
FIG. 5 is a graph illustrating the improvement in catalytic conversion efficiency.
Figure 6:
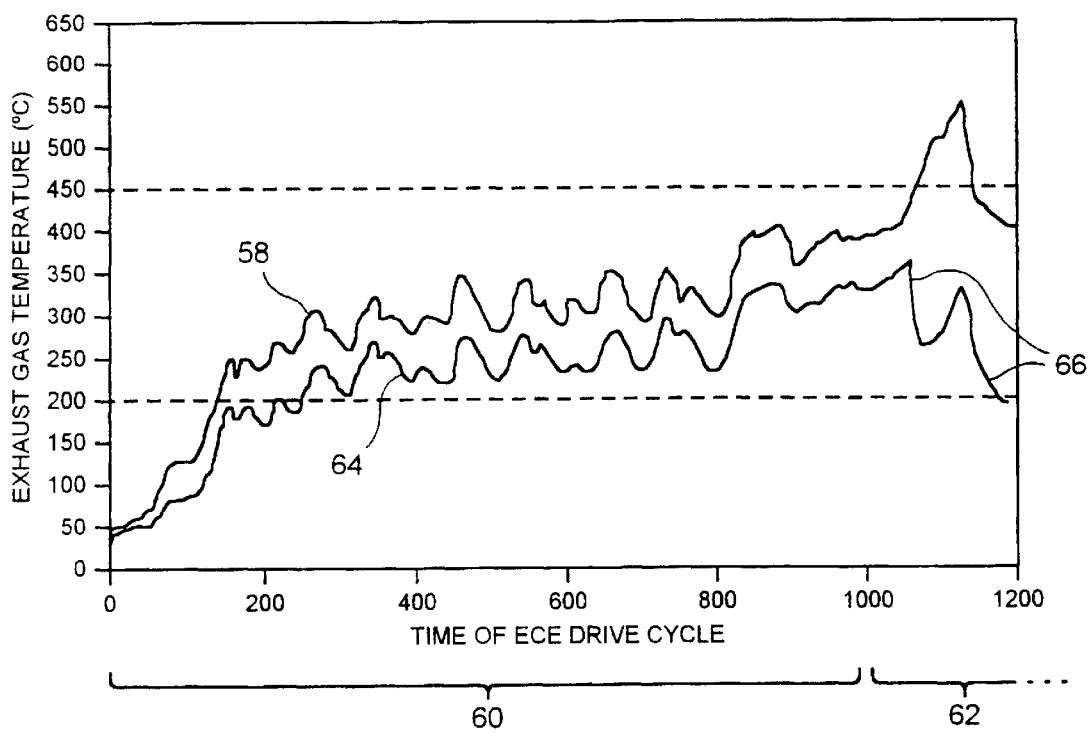
FIG. 6 is a graph illustrating the behaviour of the system of FIG. 1 during a drive cycle.

FIGS. 4, 5 and 6 illustrate the performance comparisons between the arrangements of FIGS. 1 and 3. The engine used was a 1.8 litre four-cylinder homogeneous lean burn engine coupled to a 100 KW DC dynamometer, to simulate appropriate loading on the engine.

FIG. 4 illustrates the exhaust gas temperature at the inlet of the lean NOx catalytic device 18 at an engine speed and load corresponding to vehicle cruising at a speed of 120 Km/h (about 75 mph). Bar 50 represents the temperature for the conventional system of FIG. 3, reaching about 600° C., which is well outside the operating window of 200–450° C. for the catalytic device 18. With the heat exchanger unit 22 in place, and the control valve 36 open, the temperature is reduced to about 424° C. as illustrated by bar 52, which is inside the optimum temperature range.

FIG. 5 illustrates the NOx conversion efficiency of the lean NOx device 18 for the above conditions. For an exhaust gas temperature of about 600° C., bar 54 shows that the conversion efficiency is less than 10%, resulting in high NOx pollution. However, for the lower exhaust gas temperature achieved with the heat exchanger unit 22, bar 56 shows that the conversion efficiency approaches 50%.

FIG. 6 illustrates the exhaust gas temperature (at the inlet to the lean NOx catalytic device 18) over the first 1200 seconds of the standard reference European drive cycle. Line 58 illustrates the temperature for the conventional exhaust arrangement of FIG. 3. In the urban drive cycle (portion 60), the temperature reaches the minimum operating temperature of 200° C. for the lean NOx catalytic device 18 after about 150 seconds. The temperature remains below the maximum threshold of 450° C. throughout the urban portion of the drive cycle (portion 60). However, during the extra urban portion (portion 62), the temperature quickly exceeds the maximum threshold of 450° C.

Line 64 illustrates the catalytic device inlet temperature for the exhaust arrangement of FIG. 1. In the urban drive cycle portion 60, the temperature reaches the minimum lean NOx catalytic operating temperature after about 250 seconds, the gas exhaust temperature being about 50° C. below that with the exchanger unit 22 removed, even though during this portion of the cycle the valve 36 is closed. This temperature reduction is believed to be a result of direct heat conduction through the metal tubes of the exhaust system, resulting in some heat loss through the heat exchanger unit 22. In the extra urban portion 62 of the cycle, the temperature begins to rise, resulting in the valve 36 opening to allow gas through the heat exchanger unit 22. The temperature falls abruptly, and remains below the 450° C. threshold.

Figure 7:
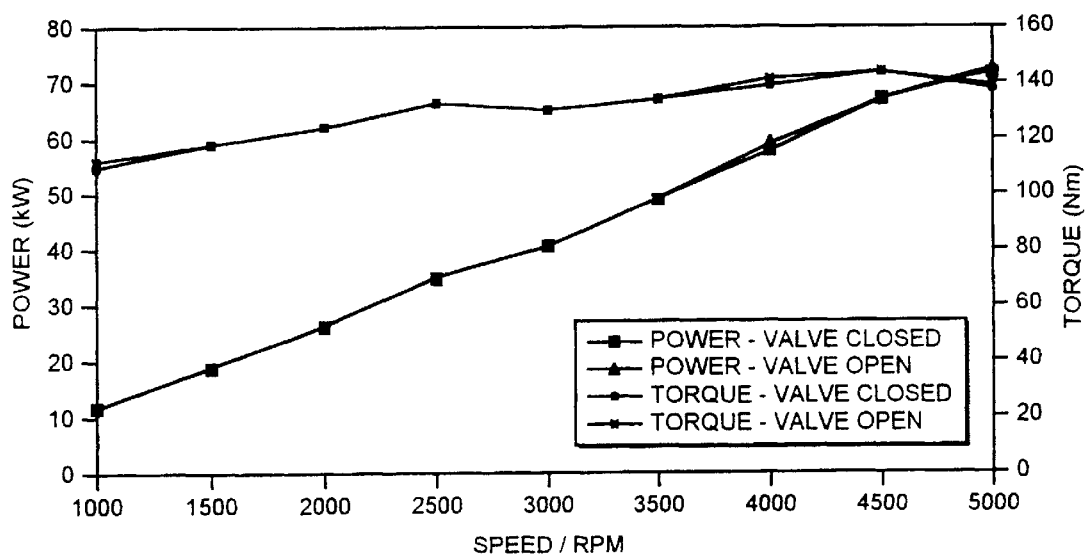
FIG. 7 is a graph comparing engine torque and power in the heat exchanger valve-open and valve-closed positions.

As described previously, the gas flow rates through the first and second flow paths 24 and 26 (FIGS. 1 and 2) are designed such that the flow distribution can be controlled by a single valve 36 downstream of the heat exchanger unit 22. FIG. 7. illustrates a comparison of the engine power and torque curves for the open and closed conditions of the valve 36. Any large variation in engine performance would be very undesirable, as this would affect the drivability of the vehicle, depending on whether the valve were to be open or closed. However, as can be seen, there is very little change in the engine performance when the valve is switched.

It will be appreciated that the cooling arrangement illustrated above can provide significantly better NOx conversion performance compared to a conventional exhaust arrangement. The use selective cooling (provided above by two flow paths) can ensure that cooling is only used when needed, i.e. when the exhaust gas temperature becomes elevated. During initial running of the engine (and during NOx purge and sulphur purge cycles), the cooling can be bypassed, to ensure that the lean NOx catalytic device 18 reaches the desired operating temperature, or purge temperature, quickly.

A further and important benefit in cooling the exhaust gases is that it inherently reduces the volume of the gas, and the thus the volume flow rate of the gas through the exhaust system. Such a reduction can reduce back-pressure and also the flow noise in the exhaust system. Back-pressure in a lean NOx system is a very important consideration, because the catalytic substrates used for the lean NOx catalytic devices generally have to be relatively large to provide good performance in lean conditions. Such large substrates can result in a back-pressure increase, and so any means of reducing the back-pressure is highly desirable.

One of the features of the air-cooled heat exchanger system described above is that there tends to be a large transient temperature drop when the control valve 36 is switched to the open condition. Such a transient drop is visible in FIG. 6 at point 66. This is a result of the heat exchanger unit 22 being initially very cool (since it is cooled by the fan 34), and acting as a very efficient heatsink when the exhaust gas is first passed through the heat exchanger 22. As more exhaust gas passes through the heat exchanger 22, the heat exchange tubes 28 heat up, and provide a lesser rate (by dissipating the heat in the air stream provided by the fan 34). Such a transient may be undesirable, as it can cause the exhaust gas temperature to fall below the minimum activation temperature for the lean NOx catalytic device 18 (about 200° C.), for example as illustrated by the point 66 in FIG. 6.

FIGS. 8–11 illustrate a second embodiment, which can provide all of the advantages of the first embodiment, and also addresses the transient problem. Where appropriate, the same reference numerals have been used to denote features equivalent to those described previously.

Figure 8:
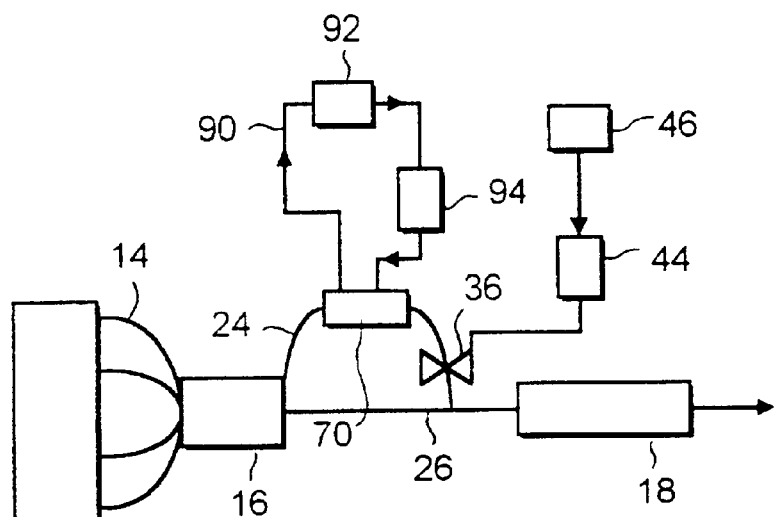
FIG. 8 is a schematic view illustrating a second embodiment of exhaust system.

The principle difference in FIG. 8 is the use of a liquid-cooled heat exchanger unit 70 in place of the air-cooled heat exchanger unit 22 of FIG. 1. The liquid-cooled heat exchanger 70 consists generally of a hollow housing 72 which, in this embodiment, is cylindrical and contains an arrangement of gas carrying tubes 74 arranged as a uniform "bundle", with spacing between adjacent tubes to allow thermal contact with the surrounding coolant liquid. The tubes 74 extend between two end plates 76 which are apertured to define an openings 77 into which each tube 74 opens at its end. The ends of the tubes 74 are welded to the end plates in a liquid-tight manner. Outside the end plates 76, the housing defines an inlet chamber 78 to allow the incoming exhaust gas to be distributed to flow into the tubes 74, and an outlet chamber 80 for the re-collimation of the gas flowing out of the tubes 74.

Figure 9:
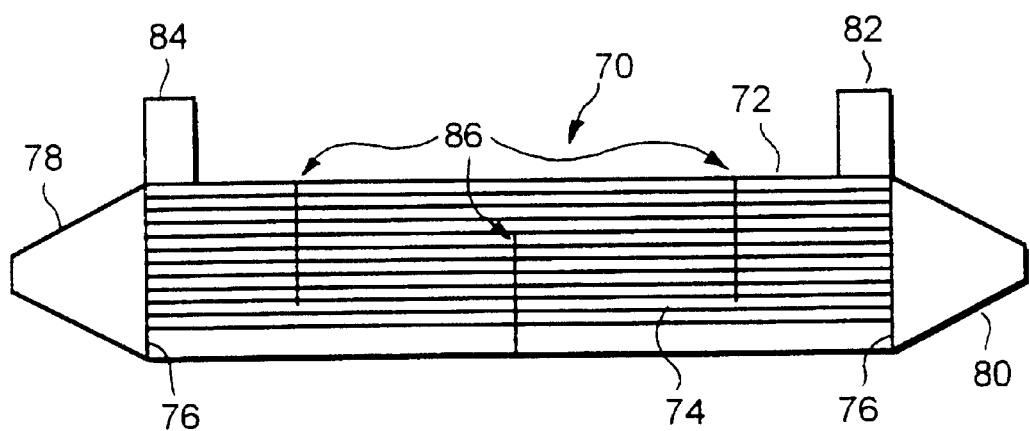
FIG. 9 is a schematic section through the heat exchanger used in FIG. 8.
Figure 10:
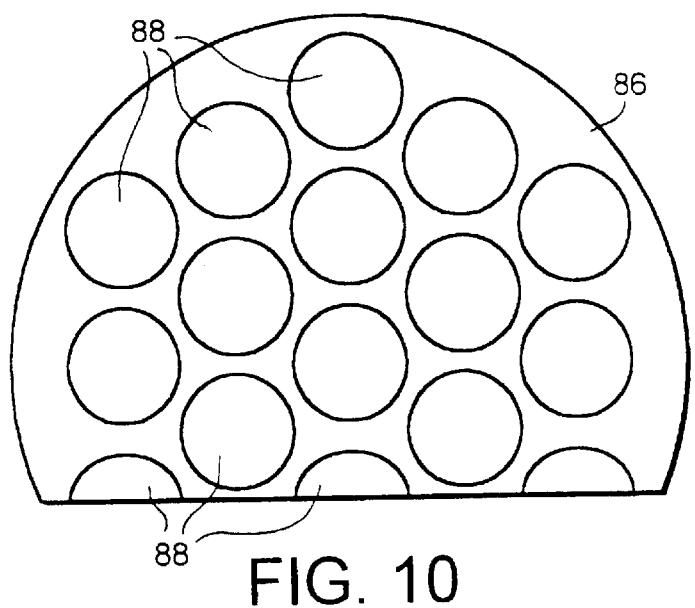
FIG. 10 is a plan view in isolation of a baffle for the heat exchanger of FIG. 9.
Figure 11:
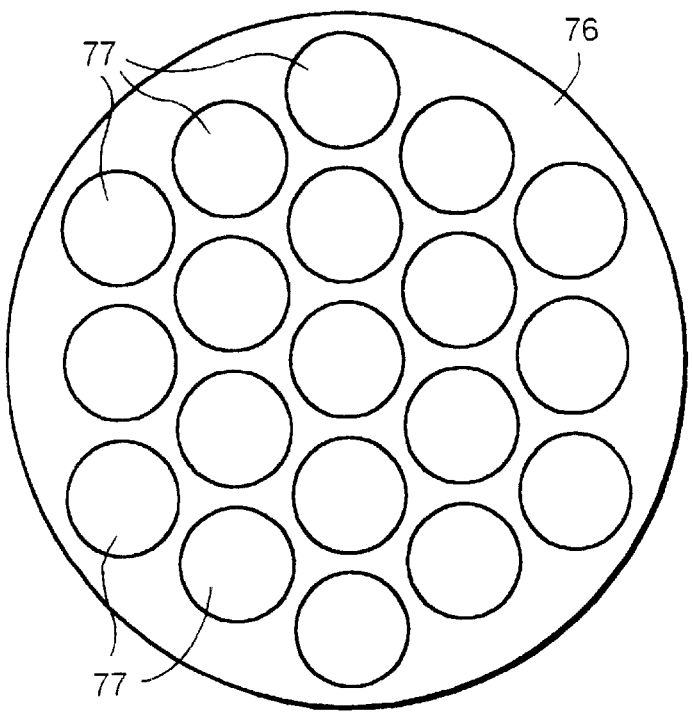
FIG. 11 is a plan view in isolation of an end plate of the heat exchanger of FIG.9.

The housing 72 defines a liquid-tight chamber surrounding the tubes 74. Liquid coolant is received through a coolant inlet port 82 and is circulated in the housing before exiting through a coolant outlet port 84. In order to ensure optimum flow of the coolant in contact with the tubes 74, the housing includes a plurality of internal baffles 86. Each baffle is similar to the end plates 76 in that it consists of a wall with openings 88 through which the tubes 74 pass. However, each baffle includes a "cut-away" portion to define a passage between the edge of the baffle and the housing to permit the flow of liquid around the baffle. As best seen in FIG. 9, the baffles 86 are arranged alternately to define a tortuous sinusoidal flow path for the coolant liquid between the inlet and outlet ports 82 and 84.

In the present embodiment, the heat exchanger 70 is made of steel, and is relatively compact, including 19 tubes 74 each of length 440 mm and diameter 14 mm. The housing has a diameter of about 88 mm, and the baffles each have a "height" of about 60 mm. The baffles are arranged with a uniform spacing of about 110 mm, and are secured in position by being spot welded to, for example, three of the tubes 74.

Liquid coolant circulated through the heat exchanger 70 by a liquid coolant circuit 90 which includes a heat dissipating radiator 92 and a coolant pump 94. The coolant circuit may be a dedicated circuit in the vehicle, but in this preferred embodiment, the coolant circuit is part of an existing coolant circuit on the vehicle, for example, the usual engine coolant circuit and using the engine radiator (92) and the engine coolant pump (94). This can avoid the additional space and cost of using an independent cooling circuit.

Figure 12:
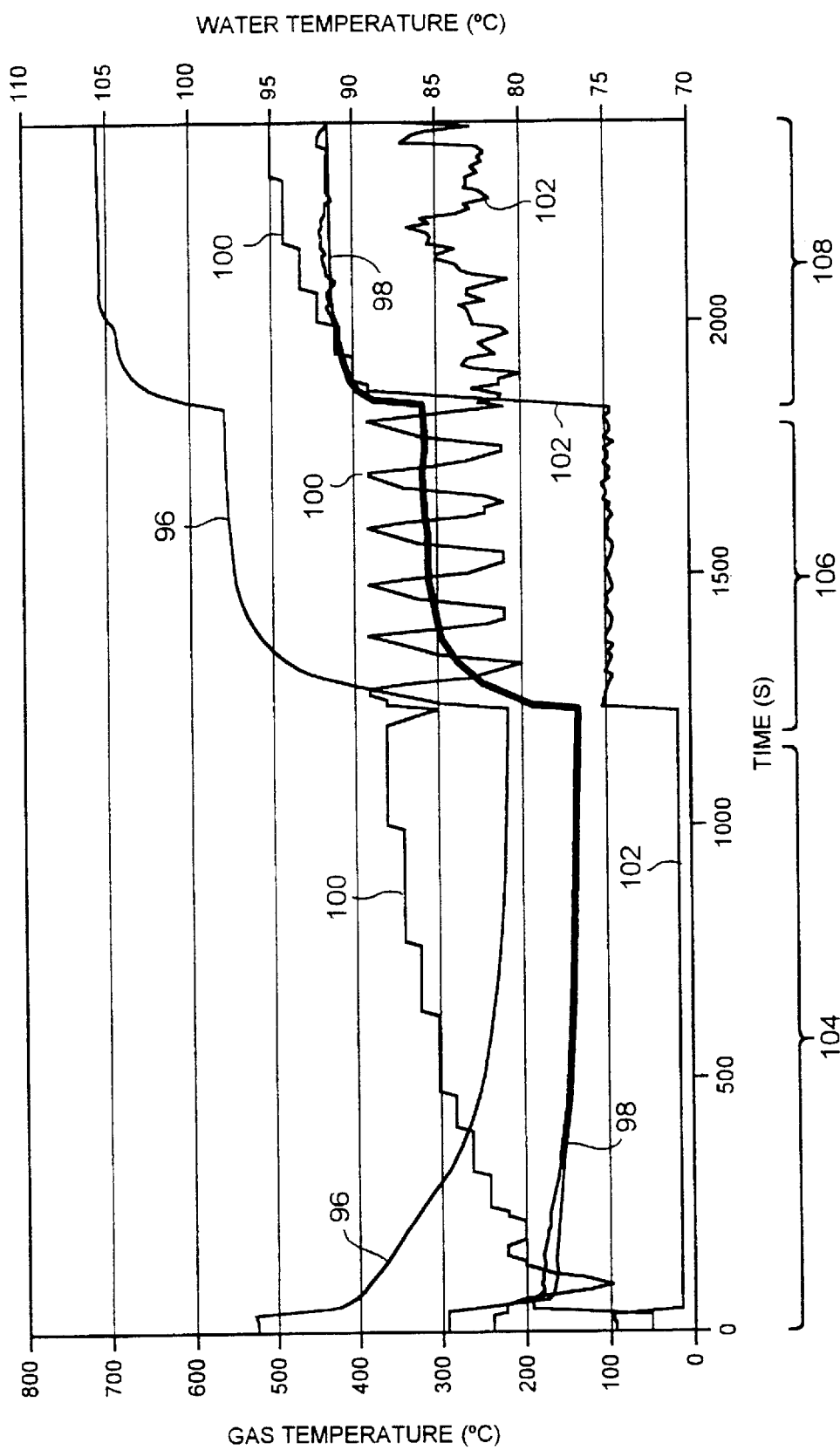
FIG. 12 is a graph illustrating the performance of the second embodiment.

FIG. 12 illustrates the performance of the exhaust system with the liquid-cooled heat exchanger, and using a similar engine and test arrangement as that described previously. In FIG. 12:

the line 96 represents the temperature of the exhaust gases at the inlet to the heat exchanger (equivalent to the exhaust gas temperature reaching the lean NOx catalytic device 18 if the heat exchanger were to be omitted);

the line 98 represents the temperature of the exhaust gas leaving the heat exchanger (equivalent to the temperature of the exhaust gas entering the lean NOx device 18 when the control valve 36 is open);

the line 100 represents the temperature of the liquid coolant being circulated through the heat exchanger; and the line 102 represents the mass flow of the exhaust gases.

The graph illustrates the measured characteristics over a cycle including three different engine settings, the first portion 104 being at an engine speed of 1000 rpm at 10% throttle, the second portion 106 being at an engine speed of 2000 rpm at 50% throttle, and the third portion 108 being at an engine speed of 4000 rpm at 100% throttle.

As can be seen from the graph, the relatively compact heat exchanger provides adequate cooling to maintain the exhaust gas temperature below about 450° C. even at elevated inlet temperatures, and high mass flow.

Figure 13:
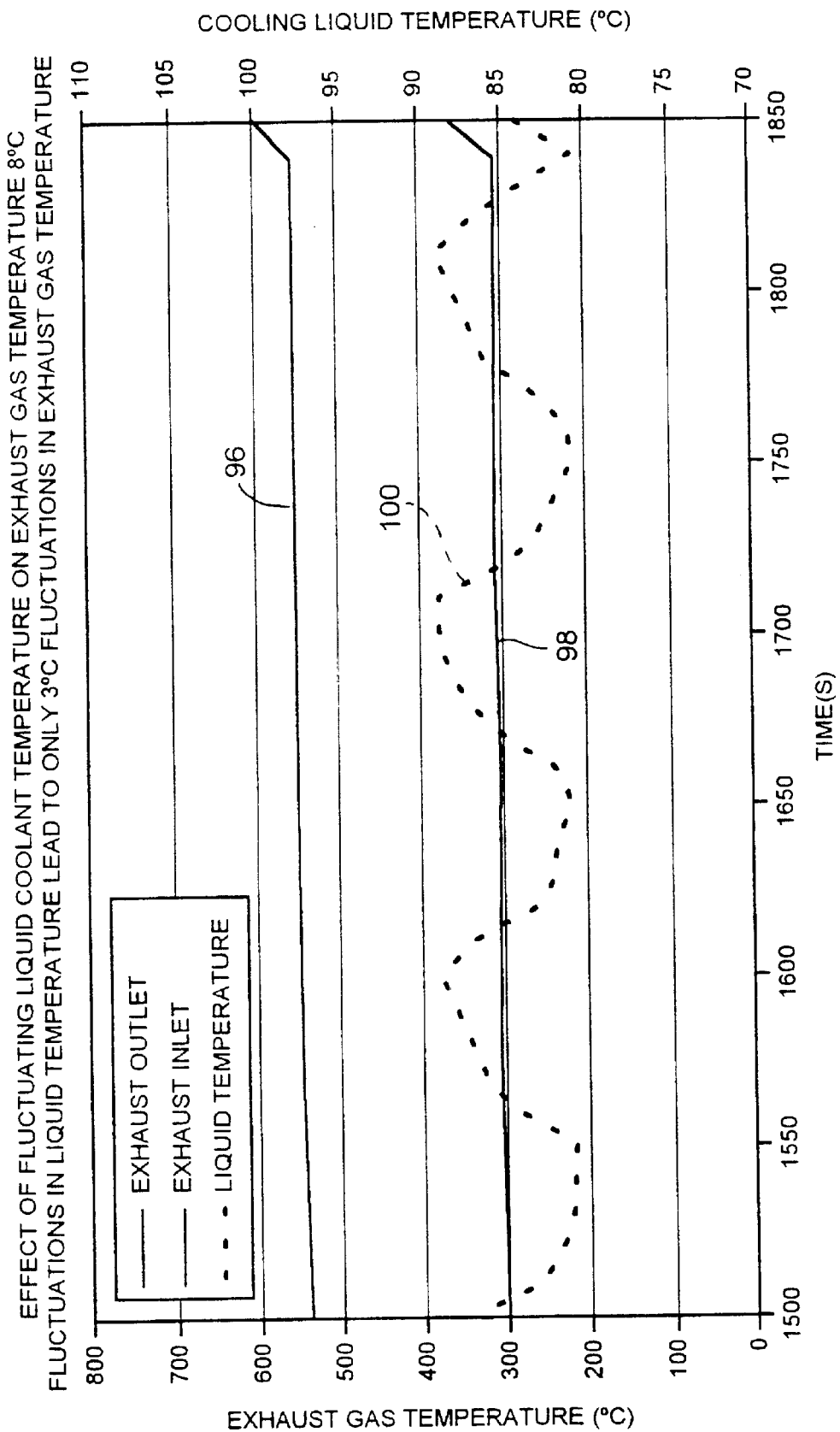
FIG. 13 is a more detailed view of a portion of FIG. 12 illustrating the effect of coolant temperature.

Moreover, the liquid heat exchanger does not produce any transients when the flow of the exhaust gas is switched from the bypass path to the heat exchanger path. This is because, unlike air-cooling, the wall temperature does not vary much. Rather, it is the high specific heat capacity of the coolant liquid which enables heat to be absorbed by the coolant, with little resultant temperature dependency. For example, referring to FIGS. 12 and 13, in the portion 106 of the test cycle described above, the water temperature in the heat exchanger fluctuates between about 80° C. and 90° C. However, there is virtually no resultant change in the gas outlet temperature from the heat exchanger (line 98).

A further advantage with a liquid coolant heat exchanger is that, in contrast to an air-cooled exchanger, the exchanger does not heat up to the high exhaust gas temperatures. The exchanger remains at the temperature of the coolant. This can avoid the need to provide high temperature dissipation devices in the exhaust system, which might prove hazardous or position critical for underfloor exhaust systems, or for engine-bay exhaust components. The lack of any requirement for a cooling air flow over the exchanger also permits the designer greater flexibility in positioning the exchanger on a vehicle.

Figure 14:
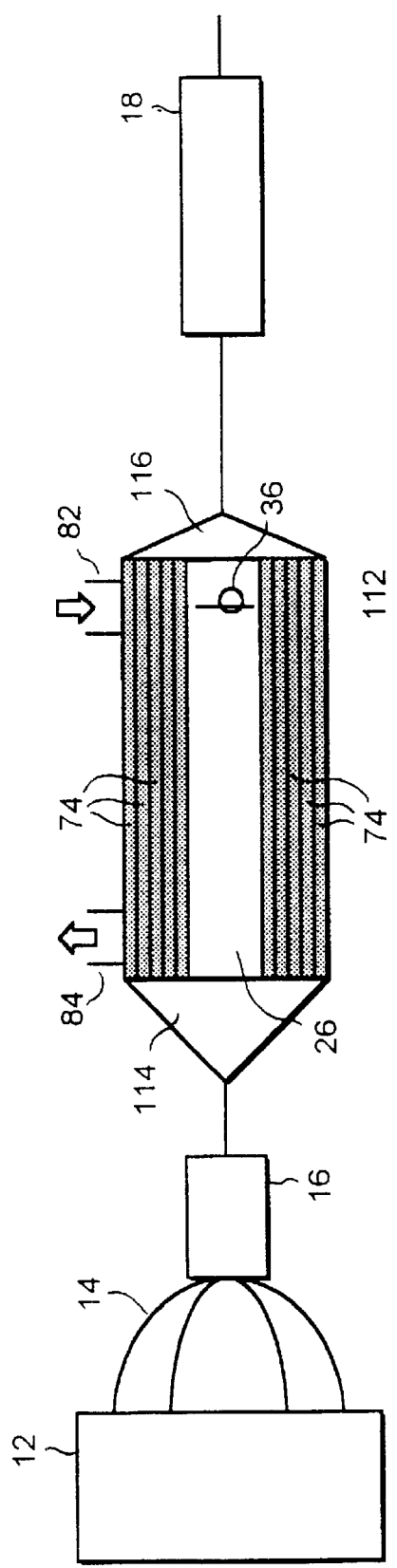
FIG. 14 is a schematic section through an alternative design of heat exchanger usable in the embodiment of FIG. 7.

FIG. 14 illustrates an alternative design of liquid coolant heat exchanger 110, which incorporates the bypass, non-heat exchange path, within the housing 112 of the heat exchanger 110. This avoids the need to employ separate conduits for the exhaust bypass path. Referring to FIG. 14, the housing 112 through which the coolant flows has a generally annular shape, and the heat exchange tubes 74 are arranged in an annular configuration within the housing 112. The central hollow of the housing provides the bypass path 26 with little, or no, thermal contact with the coolant medium. The heat exchange and non-heat exchange paths join at either end of the housing 112 at an inlet chamber 114 and an outlet chamber 116. The valve 36 is arranged within the bypass path and, in this embodiment, can be an integral part of the heat exchanger unit.

If desired, it is possible to concatenate the above heat exchanger 110 with a catalytic device within a common housing, to provide a single unit which contains a catalytic device and a temperature regulating mechanism.

Figure 15:
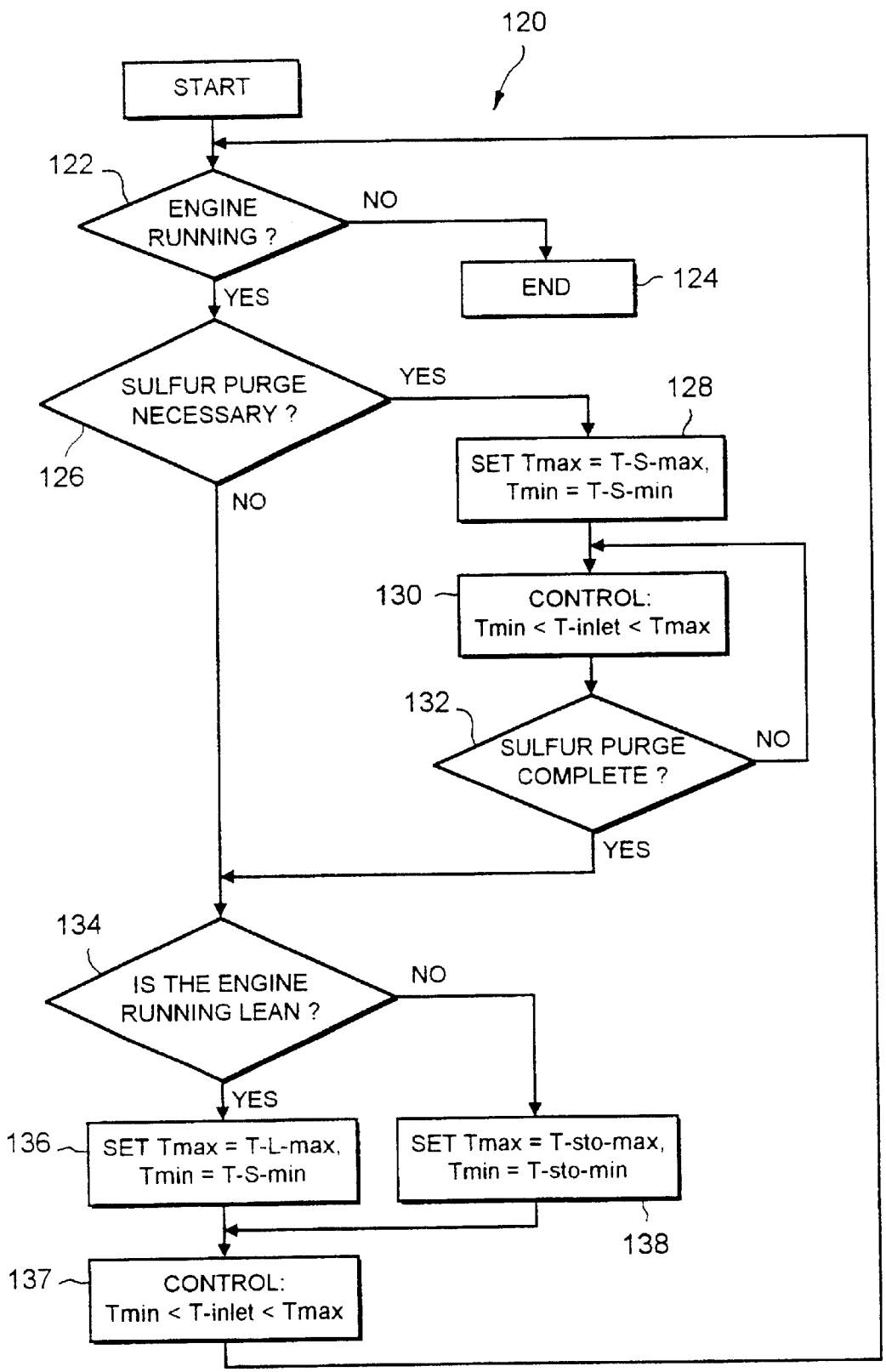
FIG. 15 is a flow diagram illustrating the steps used to control operation of the exhaust system.

FIG. 15 illustrates a typical control process loop 120 for controlling the valve 36 during the lean, rich and sulphur purge cycles of the engine. Step 122 determines whether the engine is running and, if not, the process branches to a termination step 124.

If the engine is running, step 126 determines whether a sulphur purge is necessary to clear the exhaust system of a build up of sulphur oxides. In some countries, fuel contains a fairly high sulphur content, and the sulphur oxides tend to collect in the catalytic devices (and act in competition to the conversion of nitrogen oxides). The build up of sulphur oxides is countered by a high temperature purge. If a sulphur purge is necessary, then step 126 branches to step 128 at which a target temperature window defined by Tmax, Tmin is set to correspond to the desired high temperature for a sulphur purge, generally between about 600° C. and 750° C. Step 130 controls the valve 36 to try to achieve a temperature within the window. Generally, the desired temperature is so high that the valve 36 will remain closed during this period to allow the exhaust temperature to reach maximum levels.

Step 132 determines whether the sulphur purge has been completed. If not, the process loops back to repeat steps 128 and 132 until completion of the sulphur purge.

Once the sulphur purge has been completed, or if no sulphur purge was determined to be necessary at step 126, the process proceeds to step 134 which determines whether the engine is currently running lean. If the engine is running lean, then the process proceeds through step 136 at which a target temperature window defined by Tmax, Tmin is set to correspond to the temperature range for lean NOx catalytic operation, generally between about 200° C. and 450° C. If the engine is not running lean, then the target temperature window is set at step 138 to correspond to stoichiometric NOx catalytic operation, generally between 350° C. and 750° C.

The process then proceeds to step 137 which controls the valve 36 to try to achieve a temperature within the target window. Thereafter, the process loops back to step 122 described above.

The valve 36 may be controlled either to be fully open of fully closed. Alternatively, the valve 36 may be controlled to be open by a controllable amount, through the use of proportion control, for example PID (proportional integral differential) control.

The valve 36 may be controlled simply through the use of a temperature sensor which measures directly the temperature of the gas in the exhaust system (closed loop feedback). However, the use of a liquid cooled heat exchanger system also permits an open loop control to be used which predicts the temperature of the exhaust gas without having to measure the exhaust temperature directly. This can provide cost savings in not having to use a relatively expensive exhaust gas temperature sensor.

Figure 16:
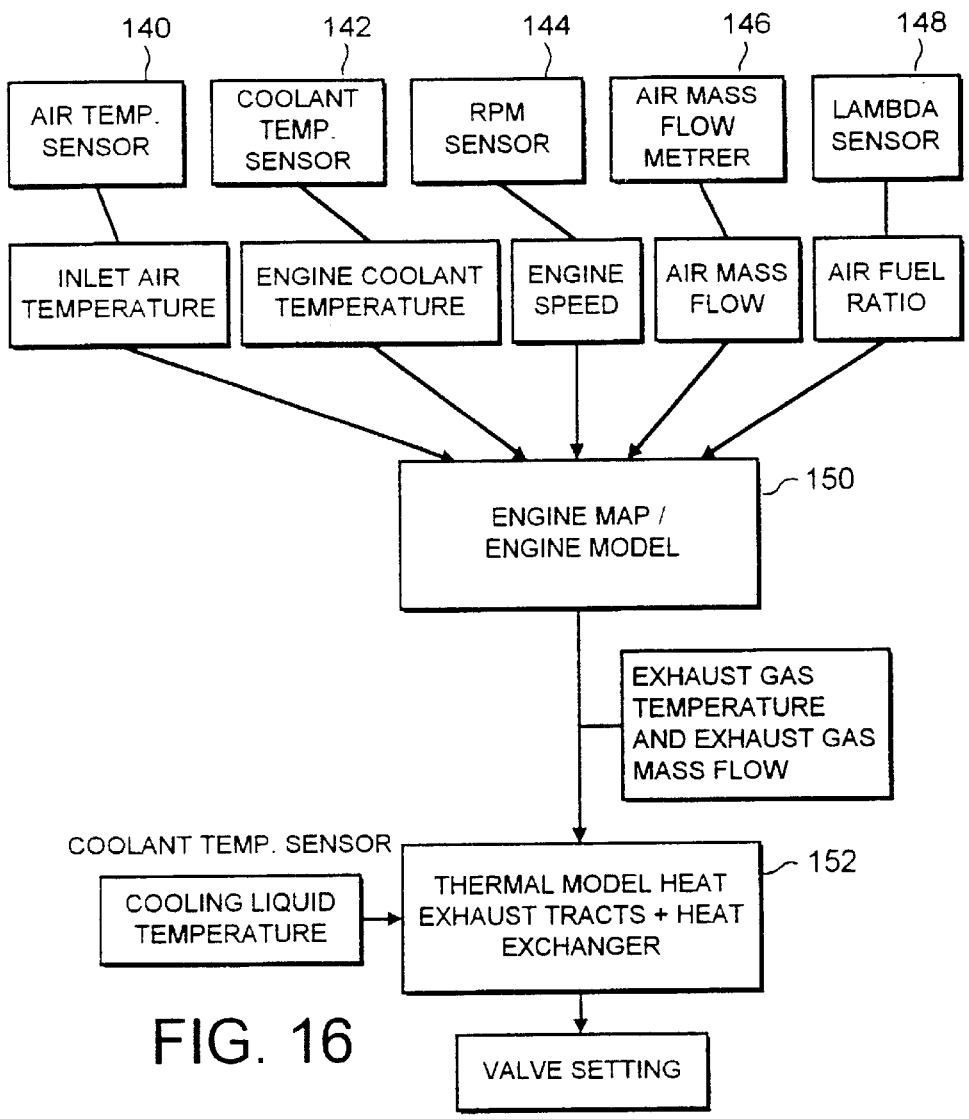
FIG. 16 is a schematic diagram illustrating a control algorithm.
Figure 17:
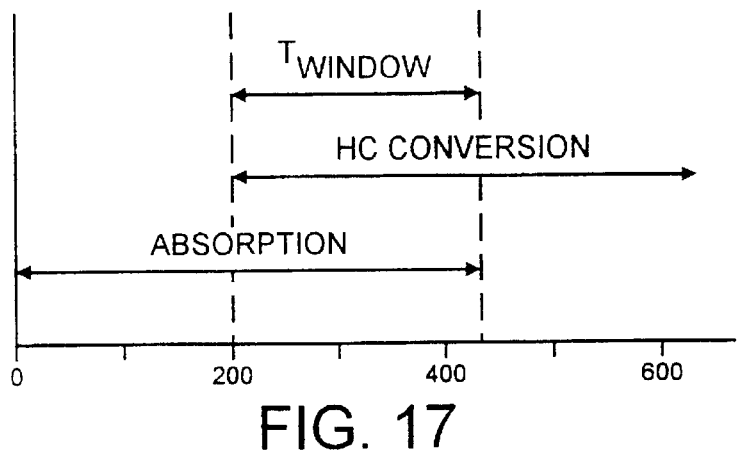
FIG. 17 illustrates conversion efficiency of a conventional lean NOx catalytic trap.

An open loop system is illustrated, for example, in FIG. 16. The system uses the outputs of sensors which are provided as standard sensors on most modem vehicles. These are: an air temperature sensor 140 which provides a signal indicative of the inlet air temperature to the engine; a coolant temperature sensor 142 which provides a signal indicative of the engine coolant temperature; an engine speed sensor 144 which provides an indication of the rpm engine speed (as measured or as deduced from the engine control system); and air mass flow sensor 146 which provides a signals indicative of the air mass flow into the engine; and a lambda sensor 148 which provides a signal indicative of the air:fuel ratio as measured from the exhaust gases.

An engine map/model 150 is used to calculate the exhaust gas temperature and the exhaust gas mass flow from the engine, and an exhaust system thermal model 152 is then used to calculate the amount of cooling required to bring the exhaust gas temperature to within the target temperature window, based on the liquid coolant temperature (for example, the same as the engine coolant temperature if a common system).

The engine map/model 150, and the thermal model 152 of the exhaust system (including the heat exchanger), can be implemented relatively easily using a computer based control system, for example, a micro controller.

It will be appreciated that the invention, particularly as described in the preferred embodiments, can provide a system for controlling the temperature of exhaust gases to within the desired operating temperature window for a catalytic device.

It will be appreciated that the above description is merely illustrative of preferred embodiments of the invention, and that many modifications may be made within the scope of the invention. Features believed to be of particular importance are defined in the appended claims. However, the Applicant claims protection for any novel feature or aspect described herein and/or illustrated in the drawings, whether or not emphasis has been placed thereon.

What is claimed is:

1. An exhaust system for an internal combustion engine defining a gas flow path and comprising a NOx catalytic device for purifying the exhaust gases, a liquid cooled heat exchanger upstream of the NOx catalytic device, and a flow control valve, the gas flow path including a cooling gas flow path through the heat exchanger and a bypass gas flow path, the flow control valve adapted to selectively route the flow of gas through the cooling gas flow path for cooling and the bypass gas flow path so that the gas entering the catalytic device is cooled to a desired catalytic operating temperature whereby NOx conversion efficiency is maintained.

2. A system according to claim 1 wherein the flow control valve has an open position for routing the flow of gas substantially through the cooling gas flow path and a closed position for routing the flow of gas substantially through the bypass gas flow path.

3. A system according to claim 1 wherein the NOx catalytic device comprises a catalytic trap.

4. A system according to claim 1 wherein the bypass gas flow path is substantially outside of the heat exchanger.

5. A system according to claim 1 wherein the bypass gas flow path passes through the heat exchanger.

6. A system according to claim 5 wherein the heat exchanger defines the cooling gas flow path and the bypass gas flow path and includes a coolant medium, the coolant medium having substantially more thermal contact with gas in the cooling gas flow path than with gas in the bypass gas flow path.

7. A system according to claim 6 wherein the flow control valve is located in the cooling gas flow path, the cooling gas flow path having a flow resistance not significantly less than the bypath gas flow path to promote gas flow through the cooling gas flow path when the control valve is open.

8. The system according to claim 1 further comprising a second catalytic device upstream of the heat exchanger.

9. The system according to claim 8 wherein the second heat catalytic device comprises a light-off catalytic converter.

10. The system according to claim 1 wherein the heat exchanger comprises a coolant inlet port and a coolant outlet port for enabling coolant to be circulated through the heat exchanger unit.

11. The system according to claim 10 further comprising a coolant circuit coupled to the inlet and outlet ports, and a radiator for cooling the coolant in the circuit.

12. A system according to claim 1 wherein the NOx catalytic device comprises an electronic circuit operable to control the cooling of the exhaust gases in dependence on at least one of the characteristic indicative of the exhaust gas temperature.

13. A system according to claim 12 further comprising at least one sensor for measuring said at least one characteristic and for producing electronic signals representative of said measured at least one characteristic.

* * * * *